(12) United States Patent
Kojima et al.

(10) Patent No.: US 6,290,198 B1
(45) Date of Patent: Sep. 18, 2001

(54) SEAT LIFTER DEVICE FOR A VEHICLE

(75) Inventors: Yasuhiro Kojima; Yukifumi Yamada, both of Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/397,130

(22) Filed: Sep. 16, 1999

(30) Foreign Application Priority Data

Sep. 16, 1998 (JP) .................................................. 10-261802

(51) Int. Cl.[7] .................................................. F16M 13/00
(52) U.S. Cl. .................. 248/422; 248/421; 248/396; 297/344.15; 296/65.12
(58) Field of Search ...................... 248/422, 421, 248/404, 396, 394, 395, 371; 297/344.15; 296/65.12

(56) References Cited

U.S. PATENT DOCUMENTS

| 4,159,095 | * | 6/1979 | Pallant et al. ........................ 248/396 |
| 4,530,481 | | 7/1985 | Klüting et al. . |
| 4,720,070 | * | 1/1988 | Nishino ................................ 248/394 |
| 4,765,582 | * | 8/1988 | Babbs ................................... 248/394 |
| 4,767,156 | * | 8/1988 | Yamada et al. ...................... 297/313 |
| 4,787,594 | * | 11/1988 | Ikegaya et al. ...................... 248/421 |
| 4,948,081 | * | 8/1990 | Hatta .................................... 248/396 |
| 4,986,509 | * | 1/1991 | Suzuki et al. ........................ 248/396 |
| 5,199,679 | * | 4/1993 | Nakamura et al. .................. 248/394 |
| 5,203,532 | * | 4/1993 | Matsuura ............................. 248/394 |
| 5,775,661 | * | 7/1998 | Matsumoto et al. ................. 248/421 |

FOREIGN PATENT DOCUMENTS

| 0 096 803 | 12/1983 | (EP) . |
| 2 065 464 | 7/1981 | (GB) . |
| 2 301 281 | 12/1996 | (GB) . |
| 4-37025 | 3/1992 | (JP) . |
| 4-116233 | 10/1992 | (JP) . |

* cited by examiner

*Primary Examiner*—Ramon O. Ramirez
*Assistant Examiner*—Kimberly Wood
(74) *Attorney, Agent, or Firm*—Burns, Doane, Swecker & Mathis, LLP

(57) ABSTRACT

A seat lifter device for a vehicle includes a reduction gear mechanism which is disposed between an operating member and a link which is adapted to be pivoted to raise and lower the vehicle seat. The reduction gear mechanism is mounted on a shaft and a spring is provided for assisting the rotation of a shaft on which the reduction gear mechanism is supported.

14 Claims, 3 Drawing Sheets

SEAT LIFTER DEVICE FOR A VEHICLE

This application is based on and claims priority under 35 U.S.C. § 119 with respect to Japanese Application No. 10(1998)-261802 filed on Sep. 16, 1998, the entire content of which is incorporated herein by reference.

FIELD OF THE INVENTION

The present invention generally relates to a vehicle seat. More particularly, the present invention pertains to a seat lifter device for a vehicle for adjusting the seat cushion height.

BACKGROUND OF THE INVENTION

Unexamined Published Japanese Utility Model Application (Kokai) No. Hei 4-116233 and Unexamined Published Japanese Utility Model Application (Kokai) No. Hei 4-37025 disclose seat lifter mechanisms that include a pair of links that connect vehicle floor side members with seat lower arm members, an operating member provided with a spring coupler and held on the seat lower arm members, and torsion bars (or a coil spring) that urge the seat upwardly. The spring coupler controls the urging force of the torsion bars so that the seat is not lifted up by the links. When the control of the spring coupler is released, the urging force of the torsion bars is transmitted to the links and the seat is lifted up by the links against the weight of the seat and weight of the passenger.

However, in these known type of seat lifter devices, because the urging force of torsion bar (or coil spring) is directly applied to the links, the torsion bar (or coil spring) must possess a large capacity to compensate for the weight of the seat and the passenger. The torsion bar (or coil spring) is thus rather large in size and quite relatively heavy. The links are also rather large and heavy.

To improve and achieve better passenger safety and comfort, there is a tendency nowadays to increase the vehicle seat weight through the attachment of seatbelts and other parts. Therefore, the large capacity torsion bar (or coil spring) must be applied and so the size and weight of the parts increases.

In light of the foregoing, a need exists for a seat lifter device that is not susceptible to the same disadvantages and drawbacks as other known seat lifter devices.

SUMMARY OF THE INVENTION

In accordance with one aspect of the present invention, a seat lifter device for a vehicle includes a vehicle floor side member, a lower arm, a front link and a rear link connecting the vehicle floor side member with the lower arm, a ratchet pivotally mounted on the lower arm, a connecting member connecting the ratchet with the rear link, and a medium reduction gear meshing with the ratchet and supported on a shaft that is held on the lower arm. An operating member is supported on the lower arm and is provided with a braking mechanism and a gear for transmitting rotatory torque to the medium reduction gear. A spring member has one end engaged with the shaft and another end operatively associated with the lower arm, with the spring member always urging the ratchet in a direction to lift the lower arm with respect to the floor side member through the shaft.

According to another aspect of the invention, a seat lifter device for a vehicle includes a vehicle floor side member, a lower arm, a front link connecting the vehicle floor side member with the lower arm, a ratchet pivotally mounted on the lower arm, a connecting member connecting the ratchet with the rear link, and a torque transmitting mechanism held on the lower arm. A medium reduction gear meshes with the ratchet and is operatively associated with the torque transmitting mechanism to rotate with the torque transmitting mechanism. An operating member is supported on the lower arm and is provided with a braking mechanism and a gear for transmitting rotatory torque to the medium reduction gear. A spring member engages the torque transmitting mechanism to apply a torque to the torque transmitting mechanism which, via the medium reduction gear, always urges the ratchet in a direction causing the lower arm to be lifted with respect to the floor side member.

In accordance with another aspect of the invention, a seat lifter device for a vehicle includes a vehicle floor side member, a lower arm adapted to be connected to a vehicle seat, a link connecting the lower arm to the vehicle floor side member, a connecting member connected to the link, an operating member supported on the lower arm and provided with a braking mechanism and an output member, a gear mechanism operatively engaged with the output member of the operating member and the connecting member to transmit rotatory torque from the output member of the operating member to the connecting member to move the link and the lower arm, and a shaft operatively engaged with the gear mechanism. A spring member engages the shaft to urge the shaft in a direction causing the gear mechanism to transmit torque to the connecting member to move the link and lift the lower arm with respect to the floor side member.

BRIEF DESCRIPTION OF THE DRAWING FIGURES

The foregoing and additional features of the present invention will be more apparent from the following detailed description considered with reference to the accompanying drawing figures in which like elements are designated by like reference numerals and wherein.

DETAILED DESCRIPTION OF THE PREFERRED EMBODIMENT

Figure 1:
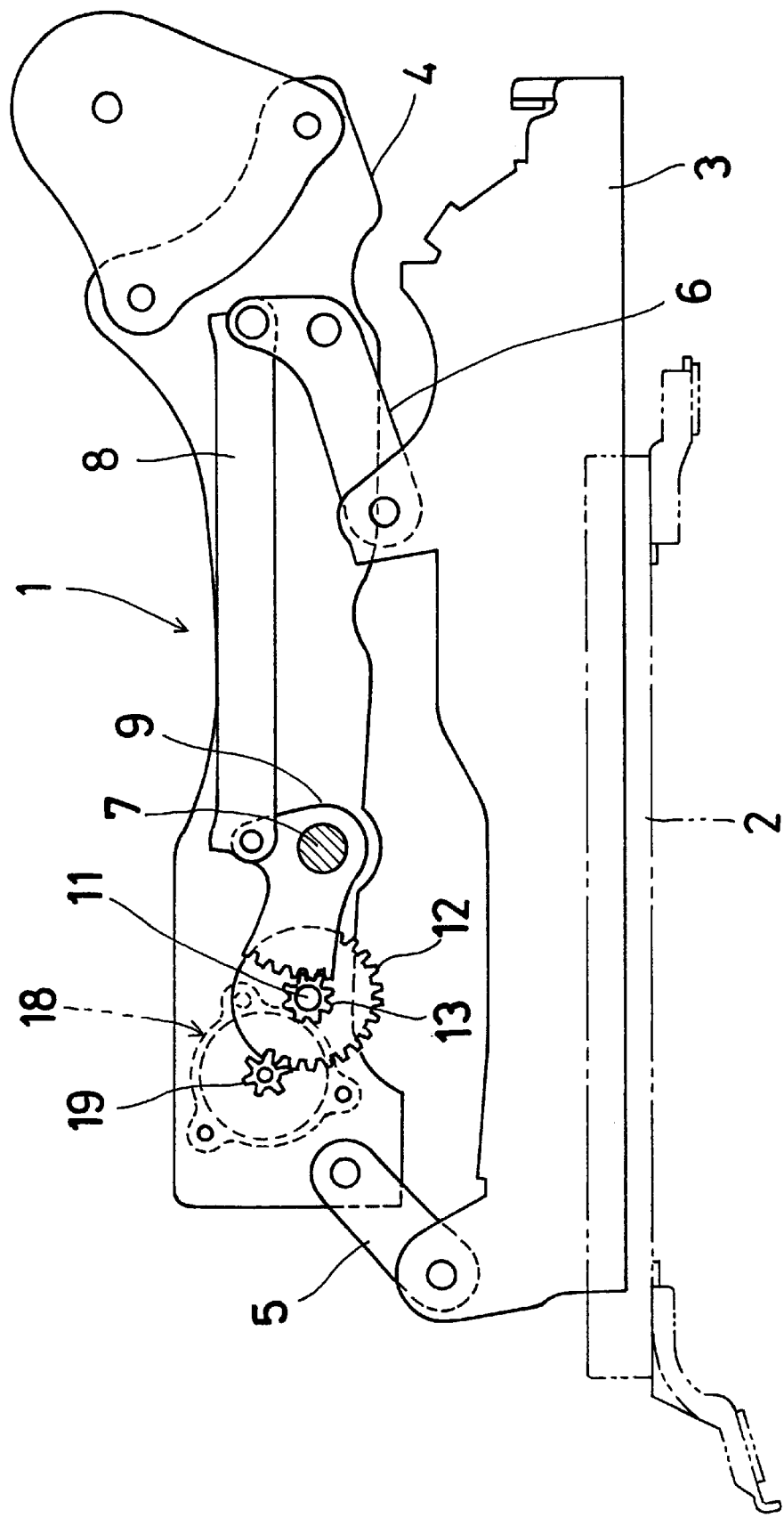
FIG. 1 is a side view of a seat lifter device in accordance with the present invention.
Figure 2:
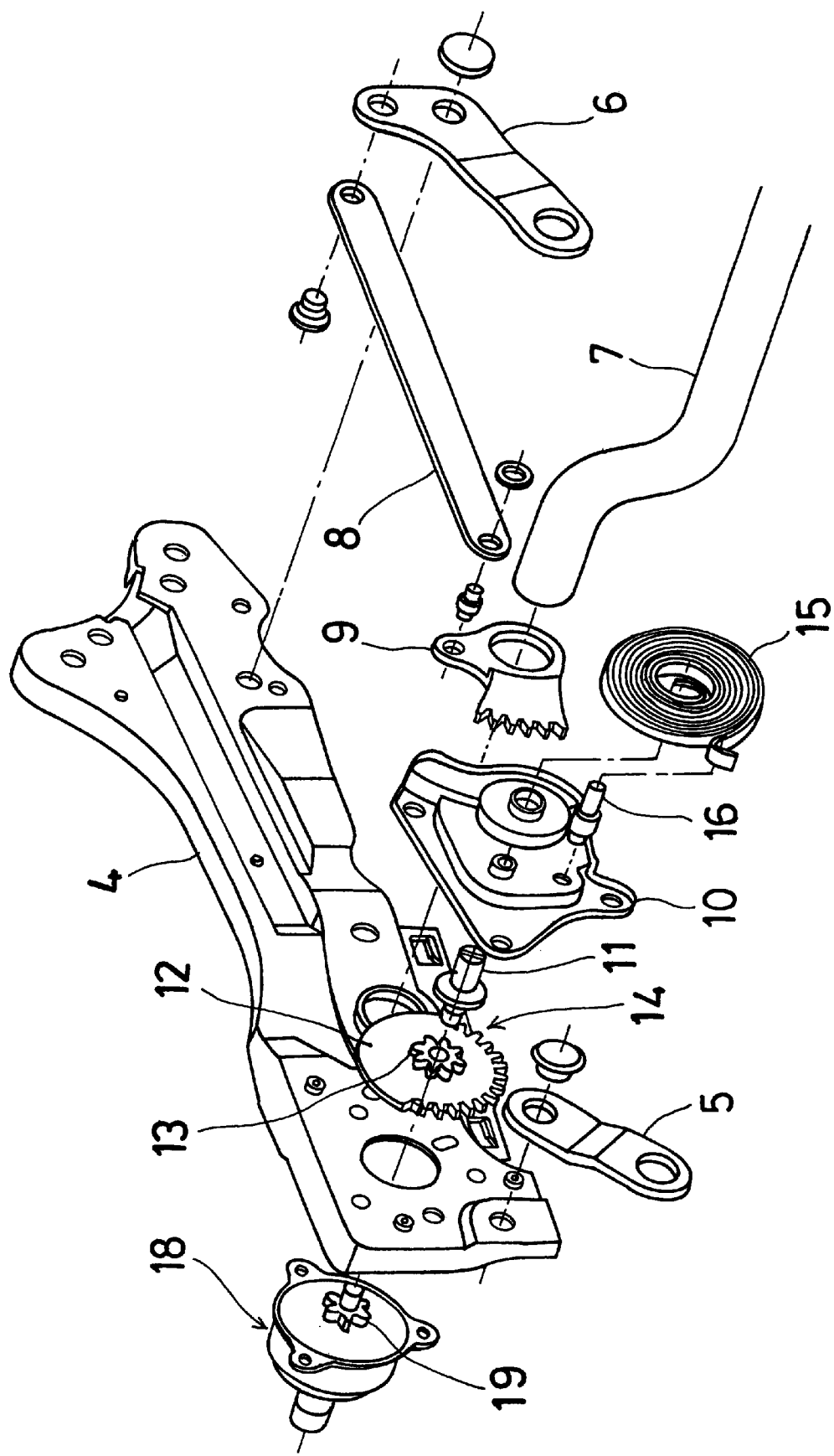
FIG. 2 is an exploded perspective view of the seat lifter device in accordance with the present invention.

Referring initially to FIGS. 1 and 2, the seat lifter device 1 of the present invention includes a pair of floor side members and a frame which holds the seat. The floor side members include a right side floor side member and a left side floor side member. It is to be understood that the drawing figures only illustrate the floor side member forming one side of the device, it being understood that the floor side member on the other side of the device has a similar construction. The pair of floor side members are composed of a pair of lower rails 2 and a pair of upper rails 3, with each upper rail 3 being slidable on a respective lower rail 2 in a back and forth manner. The right and left side floor members are thus each composed of a lower rail 2 and an upper rail 3.

The seat lifter device 1 also includes a pair of lower arms 4, a pair of front links 5 and a pair of L-shaped rear links 6. The drawing figures only illustrate one of the lower arms 4, one of the front links 5 and one of the rear links 6, but it is to be understood that a similar lower arm and similar front and rear links are provided on the opposite side of the device. Thus, one of the front links 5 and one of the rear links 6 are disposed on the right side of the device, and the other front link and the other rear link are disposed on the left side of the device. The right side front link 5 and the right side rear link 6 connect the right side lower arm member 4 to the right side floor member, and the left side front link and the left side rear link connect the left side lower arm member to the left side floor member. The lower arms 4 are operatively connected to the seat.

As shown in FIG. 2, one end of the illustrated rear link 6 is connected to a side sector gear 9 via a connecting member 8. The sector gear 9 is pivotally supported on one of the lower arms 4. There is also a generally link-shaped element (not specifically shown) corresponding to the sector gear 9 that is located on the other side of the seat lifter device. This link-shaped element and the sector gears 9 on opposite sides of the device are connected to each other by a connecting rod 7 so as to be rotatable together as a unit. Thus, torque applied to the sector gear 9 is transmitted to the link-shaped element on the other side of the seat lifter device. Also the link-shaped element on the opposite side of the seat lifter device 1 from the sector gear 9 is connected to the rear link 6 on the same side of the lifter device by way of a respective connecting member similar to the connecting member 8 shown in FIG. 2. Thus, considering the illustration in FIG. 2 to be the right side of the device as seen from the viewpoint of an individual seated in the seat, the right side sector gear 9 and the right side rear link 6 shown in FIG. 2 are connected by way of the illustrated right side connecting member 8. On the opposite side of the device, the left side link-shaped element is connected to the left side rear link by way of a left side connecting member.

As shown in FIG. 2, a bracket 10 is secured inside the lower arm 4. A shaft 11 is pivotally supported on the lower arm 4 and the bracket 10, with the shaft 11 extending to the inside of the lower arm 4. A reduction gear mechanism or medium reduction gear 14 comprised of the combination of a large gear 12 and small gear 13 is connected or mounted on the shaft 11 so that the gears 12,13 rotate together with the shaft 11.

Figure 3:
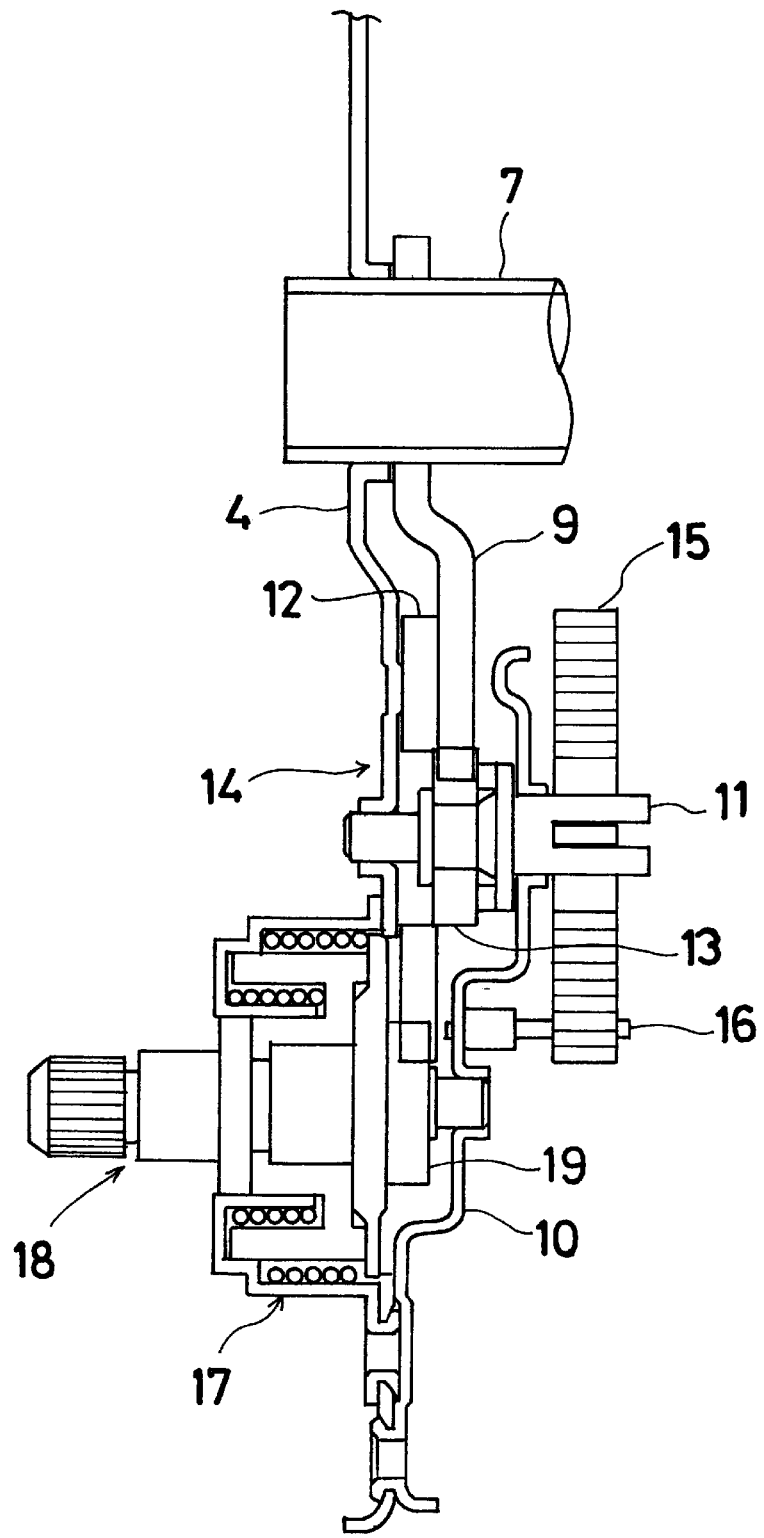
FIG. 3 is a cross-sectional view of a portion of the seat lifter device according to the present invention including the torque transmission member.

A spring 15 is wound on the projecting end portion of the shaft 11 as shown in FIG. 3. One end of the spring 15 engages the shaft 11 and the other end of the spring 15 engages a pin 16 secured on the bracket 10. The spring 15 applies a biasing force to the shaft 11 and assists in the rotation of the shaft 11 which lifts up the seat.

An operating member 18 with a spring coupler 17 is secured on the lower arm 4. A small gear 19 on the output shaft or output member of the operating member 18 meshes with the large gear 12 of the medium reduction gear 14 so as to function as a first reduction gear portion. The spring coupler 17 functions to control or brake the movements of the seat and hold it at the desired height. The reduction gear 14 and the ratchet 9 form a gear mechanism disposed between the output shaft of the operating member 18 and the connecting members for transmitting rotational torque from the operating member 18 to the connecting member 8 to cause rotation of the rear links 6 and lifting of the seat.

By rotational operation of the operating member 18 in one direction (through appropriate operational engagement of the operating member 18 in a known manner), the control or braking force of the spring coupler 17 is released. Under this condition, the output shaft is rotated, and this output shaft rotation is transmitted through the small gear 19 to the large gear 12 with the associated reduction rate. This causes rotation of the shaft 11. In this process, because the shaft 11 is affected by the spring force of the spring 15 and rotates, the small gear 13 fixed on the shaft 11 is driven by a large force with a large reduction rate. The rotation of the sector gear 9 is transmitted by the connecting member 8 to the rear link 6. Also, the rotation of the sector gear 9 shown in FIG. 2 is transmitted to the link-shaped element on the opposite side of the device by way of the connecting rod 7 to thereby cause rotation of the other rear link by virtue of the connecting element. The rotation of the rear links 6 causes the seat to be lifted. When the desired seat position is reached, the operation of the operating member 18 stops, and again the spring coupler 17 controls or brakes the movement of the seat and holds it at the desired height.

When the seat is lowered, the control or braking force of the spring coupler 17 is released and the output shaft of the operating member 18 is rotated against the lifting movement of the seat associated with the spring 15. In this condition, the lowering of the seat is performed with a relatively small operational force due to the assistance provided by the passenger weight.

The spring 15, which is shown by way of example in the illustrated and described embodiment, assists the movement of the shaft 11 which functions as a torque transmitting member between the operating member 18 and the sector gear 9, but it does not directly receive the effects from the passenger weight and the seat weight. Therefore, the spring capacity can be made much smaller than that associated with other known seat lifting devices. Thus advantageously allows the other parts of the seat lifting device to be made smaller and lighter in weight.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A seat lifter device for a vehicle comprising:

a vehicle floor side member;

a lower arm;

a front link and a rear link connecting the vehicle floor side member with the lower arm;

a ratchet pivotally mounted on the lower arm;

a connecting member connecting the ratchet with the rear link;

a reduction gear meshing with the ratchet and supported on a shaft held on the lower arm;

an operating member supported on the lower arm and provided with a braking mechanism and a gear for transmitting rotatory torque to the reduction gear; and a spring member having one end engaged with the shaft and another end operatively associated with the lower arm, the spring member always urging the ratchet in a direction to lift the lower arm with respect to the floor side member through the shaft.

2. The seat lifter device for a vehicle according to claim 1, wherein the reduction gear includes a larger gear meshing with the gear of the operating member and a smaller gear meshing with the ratchet, said larger and smaller gears being secured on the shaft.

3. The seat lifter device for a vehicle according to claim 2, wherein the braking mechanism of the operating member is a spring coupler.

4. The seat lifter device for a vehicle according to claim 3, wherein the ratchet is connected to a connecting rod.

5. A seat lifter device for a vehicle comprising:

a vehicle floor side member;

a lower arm adapted to be connected to a vehicle seat;

a link connecting the lower arm to the vehicle floor side member;

a connecting member connected to the link;

an operating member supported on the lower arm and provided with a braking mechanism and an output member;

a gear mechanism operatively engaged with the output member of the operating member and the connecting member to transmit rotatory torque from the output member of the operating member to the connecting member to move the link and the lower arm;

a shaft operatively engaged with the gear mechanism;

a spring member engaging the shaft to urge the shaft in a direction causing said gear mechanism to transmit torque to the connecting member to move the link and lift the lower arm with respect to the floor side member.

6. The seat lifter device for a vehicle according to claim 5, wherein said gear mechanism includes a larger gear meshing with a gear of the operating member and a smaller gear, said larger and smaller gears being fixedly secured on the shaft so that said larger and smaller gears rotate together with said shaft.

7. The seat lifter device for a vehicle according to claim 5, wherein the braking mechanism of the operating member is a spring coupler.

8. The seat lifter device for a vehicle according to claim 5, wherein said gear mechanism includes a ratchet pivotally mounted on the lower arm.

9. A seat lifter device for a vehicle comprising:

a vehicle floor side member;

a lower arm;

a front link connecting the vehicle floor side member with the lower arm;

a ratchet pivotally mounted on the lower arm;

a connecting member connecting the ratchet with the rear link;

a torque transmitting mechanism held on the lower arm;

a reduction gear mechanism meshing with the ratchet and operatively associated with the torque transmitting mechanism to rotate with the torque transmitting mechanism;

an operating member supported on the lower arm and provided with a braking mechanism and a gear for transmitting rotatory torque to the reduction gear mechanism; and a spring member engaging the torque transmitting mechanism to apply a torque to the torque transmitting mechanism which, via the reduction gear mechanism, always urges the ratchet in a direction causing the lower arm to be lifted with respect to the floor side member.

10. The seat lifter device for a vehicle according to claim 9, wherein the reduction gear mechanism includes a larger gear meshing with the gear of the operating member and a smaller gear meshing with the ratchet.

11. The seat lifter device for a vehicle according to claim 10, wherein said larger and smaller gears are fixedly secured on the shaft so that said larger and smaller gears rotate together with said shaft.

12. The seat lifter device for a vehicle according to claim 11, including a front link connecting the lower arm to the vehicle floor side member.

13. The seat lifter device for a vehicle according to claim 9, wherein the braking mechanism of the operating member is a spring coupler.

14. The seat lifter device for a vehicle according to claim 9, wherein the ratchet is connected to a connecting rod.

* * * * *